Patented Apr. 20, 1937

2,077,905

UNITED STATES PATENT OFFICE 2,077,905

EMULSIONS

Preston R. Smith, Rahway, N. J., assignor, by mesne assignments, to The Barber Company, Inc., Philadelphia, Pa., a corporation of New Jersey No Drawing. Application February 11, 1929, Serial No. 339,264

5 Claims. (Cl. 106—31)

My invention relates to an improvement in emulsions and is more especially adaptable to water external phase bituminous emulsions, such, for example, as asphalt emulsions which are commonly used for bonding in admixture with an aggregate, as trap rock, limestone, gravel, and the like, in the making and repair of roadways, pavements, etc.

In the preparation of a mixture of bituminous emulsion and an aggregate, it is customary to mix the emulsion and the aggregate by shoveling, or in a mechanical mixer such as a concrete mixer, until the aggregate is uniformly covered with the emulsion, the coated aggregate being then applied to the purpose for which it was prepared. Heretofore, however, it has been found that during the mixing of the emulsion and aggregate from certain sources, the emulsion has shown a tendency to break adjacent to or on the surface of the aggregate, as evidenced by the fact that bitumen is freed and adheres or sticks to the shovel or to the walls of the mixer, and where a mixer is used builds up on the walls of the mixer, under the influence of centrifugal force to such an extent as to require frequent interruption of the mixing for cleaning out of the mixer, with consequent loss of time and efficiency.

Now, as a result of my invenstigations, I believe that the breaking of the emulsion or freeing of bitumen adjacent to or on the surface of certain aggregates is due to the presence in the aggregate of certain salts, such as soluble magnesium or calcium salts, or other alkaline earth salts, which, becoming dissolved in the water of the continuous phase of the emulsion in contact with the surfaces of the aggregate, cause the emulsion to break locally and release quantities of tacky bitumen which will stick to a shovel, or which, under the influence of centrifugal force, are thrown out to and build up on the walls of a mixer.

Now in accordance with my invention, I have discovered that the sticking of bitumen to a mixing device in the preparation of mixtures of bituminous emulsion and aggregate may be prevented by the presence in the emulsion of a water soluble salt which will react or combine with alkaline earth salts to form a water insoluble compound and hence negative the effect upon the emulsion of soluble alkaline earth salts contained in the aggregate.

In the practical adaptation of my invention there may be included in the bituminous emulsion a water soluble salt such as a carbonate, as for example, sodium carbonate, sodium bi-carbonate, potassium carbonate, or the like, a silicate, as for example, sodium silicate, potassium silicate, or the like, an oxalate, as for example, ammonium oxalate, oxalic acid, alkali oxalate, or the like, or other water soluble salt operably equivalent therefor.

In the practical adaptation of my invention the soluble salt adapted to negative the effect of alkaline earth salts may be added to the emulsion in, for example, the mixer, or on the addition of the aggregate, or to the emulsion as soon as it is made, or in the preparation of the emulsion to the aqueous phase before or after the bitumen is emulsified therein. The soluble salt adapted to negative the effect of the alkaline earth salts may be added to the aggregate, before mixing with the emulsion, by treatment of the aggregate with an aqueous solution thereof.

By way of illustrating the practical adaptation of my invention, for example, to an asphalt emulsion there may be added from 0.1 ounce to 1.0 ounce of sodium carbonate to each gallon of the emulsion or alternatively there may be added from 0.25 ounce to 2.0 ounces of sodium silicate "S" grade, to each gallon of emulsion.

As a practical illustration of my invention, for example, I find that a certain slag much used for road construction in Ohio County, West Virginia, contains on analysis of the water extract thereof .38% CaO and .009% MgO. A cubic foot of this slag weighs about 70 pounds and to completely precipitate all of the soluble alkaline earth compounds it is necessary to use in carrying out my invention approximately one pound sodium phosphate, 0.4 pound sodium oxalate or the equivalent amounts of other suitable salts. As a practical matter I find that the water soluble salts are not leached out of the slag (or other aggregate) instantly and that only a comparatively small amount of such soluble alkaline earth salts will be leached out during the two or three minutes that the mixing operation normally requires. Therefore, I find that it is sufficient to add only about one-tenth of the amount, or less, of precipitating salt required for complete precipitation of the alkaline earth salts to this bituminous mixture and thus effect an economy in the use of the reagent.

I have found as a practical matter that when using the slag mentioned above and mixing it with the bituminous emulsion for two or three minutes that 0.1 pound sodium phosphate or 0.04 pound sodium oxalate or the equivalent amounts of other suitable salts will enable me to prepare the bituminous mixture and place it without having the emulsion break and the bitumen stick to the mixer. It is to be understood therefore that with a given aggregate and a given emulsion that the amount of such added soluble salts as are suitable for carrying out my invention may vary with the time of mixing or other conditions.

Having now fully described my invention, what I claim and desire to protect by Letters Patent is:

1. The method of forming a bituminous composition, which includes mechanically admixing an aggregate carrying a water-soluble alkaline earth salt and a water external phase bituminous emulsion of the soap type while reacting on alkaline earth salt carried by the aggregate adjacent its surface with a salt adapted to form therewith a water-insoluble compound, said last mentioned salt being in amount sufficient to react with substantially all of said alkaline earth salt adjacent the surface of the aggregate and continuing the admixing until the aggregate is substantially uniformly coated with bitumen.

2. The method of forming a bituminous composition, which includes mechanically admixing an aggregate carrying a water-soluble alkaline earth salt and a water external phase bituminous emulsion of the soap type containing in solution a salt which will react with alkaline earth salt carried by the aggregate adjacent its surface to form therewith a water-insoluble compound the said salt in solution in the continuous phase of the emulsion being in amount sufficient to react with substantially all of said alkaline earth salt adjacent the surface of the aggregate and continuing the admixing until the aggregate is substantially uniformly coated with bitumen.

3. A bituminous composition including an aggregate substantially uniformly covered with bitumen and carrying a water-insoluble reaction product produced by the reaction of a water-soluble salt with an alkaline earth salt initially carried by the aggregate adjacent its surface.

4. A bituminous composition including an aggregate substantially uniformly covered with bitumen deposited thereon from a water external phase bituminous emulsion of the soap type and carrying a water-insoluble reaction product produced by the reaction of a water-soluble salt carried in solution in the continuous phase of said emulsion with an alkaline earth salt initially carried by the aggregate.

5. The method of forming a bituminous composition which includes mechanically admixing an aggregate carrying a water-soluble alkaline earth compound and a water-external-phase bituminous emulsion of a character to be broken by the alkaline earth compound while reacting on alkaline earth compound carried by the aggregate adjacent its surface with a salt adapted to form therewith a water-insoluble compound, said salt being in amount sufficient to react with substantially all of said alkaline earth compound adjacent the surface of the aggregate and continuing the admixing until the aggregate is substantially uniformly coated with bitumen.

PRESTON R. SMITH.